UNITED STATES PATENT OFFICE.

WILHELM BAUER, OF VOHWINKEL, AND ALFRED HERRE AND RUDOLF MAYER, OF ELBERFELD, GERMANY, ASSIGNORS TO FARBENFABRIKEN VORM. FRIEDR. BAYER & CO., OF ELBERFELD, GERMANY, A CORPORATION OF GERMANY.

VAT DYESTUFF.

985,769.  Specification of Letters Patent.  Patented Mar. 7, 1911.

No Drawing.  Application filed June 18, 1910. Serial No. 567,690.

*To all whom it may concern:*

Be it known that we, WILHELM BAUER, residing at Vohwinkel, and ALFRED HERRE and RUDOLF MAYER, residing at Elberfeld, Germany, citizens of the German Empire, have invented new and useful Improvements in Vat Dyestuff, of which the following is a specification.

Our invention relates to the manufacture and production of new and valuable vat dyestuffs. They are obtained by condensing monohalogenated beta-naphthisatin derivatives in which the oxygen of the alpha-keto group is replaced by easily movable or replaceable substituents, e. g. halogen, sulfur, the amino group, the alkoxy group with a para-substituted alpha-naphthol, especially 4-bromo-1-naphthol, 4-chloro-1-naphthol, 4-ethoxy-1-naphthol.

The new dyes are in a dry state dark crystalline powders which are soluble in hot nitrobenzene generally with a blue coloration, and which yield with hydrosulfite and caustic soda lye generally yellow vats dyeing cotton after exposure to air bluish-gray to black shades remarkable for their fastness to chlorin.

In order to illustrate the new process more fully we can proceed as follows, the parts being by weight:—69 parts of bromo-beta-naphthisatin are converted into the alpha-chlorid by heating them with 55 parts of $PCl_5$ and 500 parts of dry chlorobenzene. The mixture thus obtained is then added to a warm solution, which is well stirred, of 60 parts of 4-bromo-1-naphthol in 600 parts of dry chlorobenzene; stirring is continued for about 12 hours. After cooling the dye is filtered off and washed with benzene and ether and can be further purified by a recrystallization from nitrobenzene. It is a dark crystalline powder soluble in concentrated sulfuric acid with a bluish-olive color, scarcely soluble in benzene and cold nitrobenzene, soluble in hot nitrobenzene with a blue color. It forms a vat with hydrosulfite and caustic alkali, from which cotton is dyed after exposure to air in fast bluish-gray to black shades. Chloro-beta-napthisatin furnishes a similar product.

We claim:—

1. The herein described new dyestuffs obtainable from a monohalogenated beta-naphthisatin derivative in which the oxygen of the alpha-keto group is replaced by easily movable or replaceable substituents and a para substituted alphanaphthol, which dyestuffs are in a dry state dark crystalline powders which are soluble in hot nitrobenzene generally with a blue coloration, and which yield with hydrosulfite and caustic soda lye vats dyeing cotton after exposure to air from gray to black shades remarkable for their fastness to chlorin, substantially as described.

2. The herein described new dyestuff obtainable from bromo-beta-naphthisatin-alpha-chlorid and 4-bromo-1-naphthol which dyestuff is in a dry state a dark crystalline powder, soluble in concentrated sulfuric acid with a bluish-olive color, and which yields with hydrosulfite and caustic soda lye a yellow vat from which cotton is dyed a bluish-gray to black remarkable for its fastness to chlorin, substantially as described.

In testimony whereof we have hereunto set our hands in the presence of two subscribing witnesses.

WILHELM BAUER. [L. S.]
ALFRED HERRE. [L. S.]
RUDOLF MAYER. [L. S.]

Witnesses:
  OTTO KÖNIG,
  CHAS. J. WRIGHT.